(12) United States Patent
Radermacher

(10) Patent No.: US 7,677,511 B2
(45) Date of Patent: Mar. 16, 2010

(54) LOAD-BEARING FRAMEWORKS

(75) Inventor: Uwe Radermacher, Weibern (DE)

(73) Assignee: Wolfcraft GmbH, Kempenich (DE)

( * ) Notice: Subject to any disclaimer, the term of this patent is extended or adjusted under 35 U.S.C. 154(b) by 112 days.

(21) Appl. No.: 10/834,608

(22) Filed: Apr. 28, 2004

(65) Prior Publication Data

US 2005/0012019 A1    Jan. 20, 2005

(30) Foreign Application Priority Data

Apr. 28, 2003   (DE)  ................ 103 19 067

(51) Int. Cl.
*F16M 11/20*   (2006.01)
(52) U.S. Cl. ................. 248/188.9; 248/188; 248/188.2; 248/188.4
(58) Field of Classification Search ............. 248/188.8, 248/188.9, 163.1, 166, 188, 188.1, 188.2, 248/188.4
See application file for complete search history.

(56) References Cited

U.S. PATENT DOCUMENTS

| | | | |
|---|---|---|---|
| 326,801 A | 9/1885 | Sprague | |
| 501,242 A | 7/1893 | Bufkin et al. | |
| 850,317 A | 4/1907 | Ridgely | |
| 2,836,278 A | 5/1958 | Kindell | |
| 3,083,806 A | 4/1963 | Haines | |
| 3,635,327 A | 1/1972 | Thiessen | |
| 3,901,378 A | 8/1975 | Rolland | |
| 4,159,677 A | 7/1979 | Smith | |
| 4,492,354 A | 1/1985 | Rice | |
| 4,576,357 A * | 3/1986 | Schrepfer | .................. 248/662 |
| 4,681,215 A | 7/1987 | Martin | |
| D293,052 S | 12/1987 | Handler et al. | |
| 4,715,488 A | 12/1987 | Hewitt et al. | |
| 4,798,359 A * | 1/1989 | Ball | ........................ 248/188.3 |
| 4,911,279 A | 3/1990 | Thunissen | |
| 4,970,968 A * | 11/1990 | Mattesky | ..................... 108/117 |
| 5,064,156 A | 11/1991 | Handler et al. | |
| 5,086,911 A | 2/1992 | Douglas | |
| D325,679 S | 4/1992 | O'Mealy et al. | |
| 5,108,216 A | 4/1992 | Geyer et al. | |
| D328,397 S | 8/1992 | Handler et al. | |
| D338,820 S | 8/1993 | Sheftel | |
| 5,299,656 A | 4/1994 | Grill | |
| 5,337,875 A | 8/1994 | Lee | |
| 5,435,411 A | 7/1995 | Borgatti | |
| D360,953 S | 8/1995 | Sheftel | |
| D361,390 S | 8/1995 | Sheftel | |
| D362,608 S | 9/1995 | Hewitt | |

(Continued)

FOREIGN PATENT DOCUMENTS

DE        199 21 455 A1    12/1999

(Continued)

*Primary Examiner*—J Allen Shriver, II
*Assistant Examiner*—Steven M Marsh
(74) *Attorney, Agent, or Firm*—K&L Gates LLP

(57) ABSTRACT

Load-bearing frameworks (40), tables or the like with four feet have at least one foot being formed by a cap (1) which is associated with a cap-carrier (2). The cap (1) can be rotated about a horizontal axis (25). The cap (1) forms a standing surface (3) by way of a portion of its circumferential surface (5). For stabilizing purposes, the circumferential surface (5) runs along a helical curve around the horizontal axis (25).

23 Claims, 3 Drawing Sheets

U.S. PATENT DOCUMENTS

| | | | |
|---|---|---|---|
| 5,460,348 A * | 10/1995 | Cox | 248/638 |
| 5,667,207 A | 9/1997 | Pistole | |
| 5,810,038 A * | 9/1998 | Carpinella | 135/77 |
| 5,878,839 A | 3/1999 | Lin | |
| 6,018,974 A | 2/2000 | Potthoff et al. | |
| 6,095,319 A | 8/2000 | Noniewicz et al. | |
| D432,246 S | 10/2000 | Pestone | |
| 6,161,681 A | 12/2000 | Kalm | |
| 6,179,024 B1 | 1/2001 | Yang | |
| 6,179,116 B1 | 1/2001 | Noniewicz et al. | |
| D439,820 S | 4/2001 | Yang | |
| 6,279,717 B1 | 8/2001 | Chen | |
| 6,302,255 B1 | 10/2001 | Hollander | |
| 6,357,705 B1 | 3/2002 | Hackett | |
| D457,998 S | 5/2002 | Pestone | |
| D459,048 S | 6/2002 | Leemans | |
| 6,481,564 B2 | 11/2002 | Kalm | |
| 6,575,213 B1 | 6/2003 | Houk | |
| 6,623,082 B1 * | 9/2003 | Huang | 297/463.1 |
| 6,626,405 B1 * | 9/2003 | Keast et al. | 248/188.9 |
| 6,758,449 B1 | 7/2004 | Chen et al. | |
| 6,761,340 B2 * | 7/2004 | Shaw | 248/188.9 |
| 6,883,530 B2 * | 4/2005 | Kawakami | 135/84 |
| 6,886,789 B2 * | 5/2005 | Felsenthal | 248/188.9 |

FOREIGN PATENT DOCUMENTS

| | | |
|---|---|---|
| DE | 100 55 925 A1 | 5/2002 |
| DE | 202 08 954 U1 | 12/2002 |
| DE | 10319067 | 11/2004 |
| FR | 564 568 | 1/1924 |
| FR | 2 627 417 | 8/1989 |
| GB | 2 042 039 A | 3/1980 |
| GB | 2 296 938 A | 7/1996 |
| JP | 4-292349 | 10/1992 |

* cited by examiner

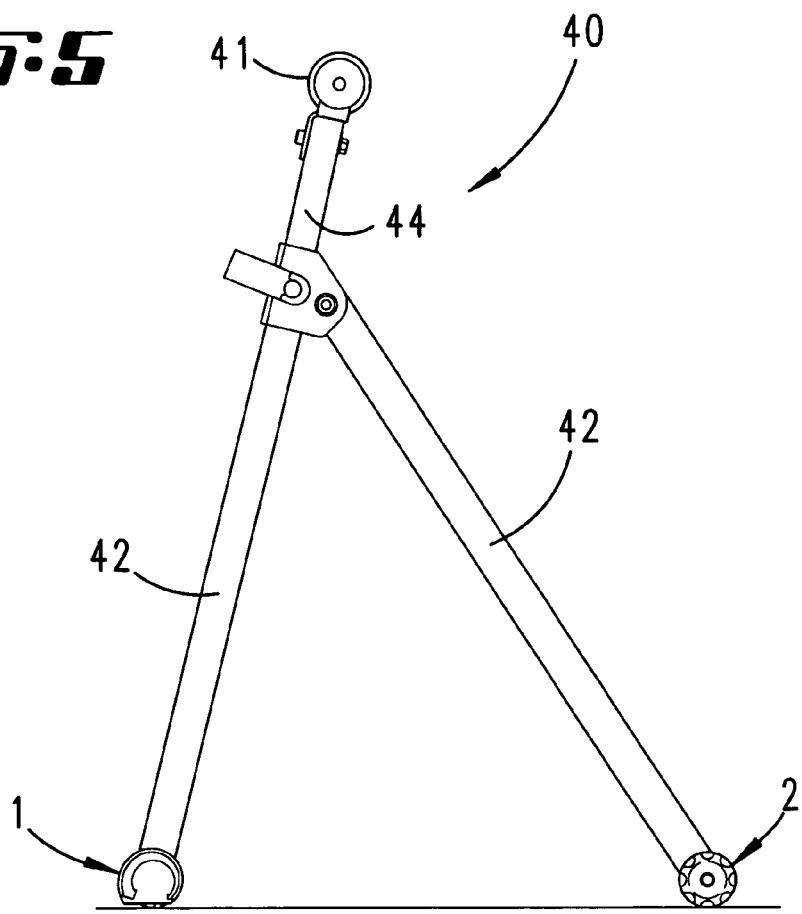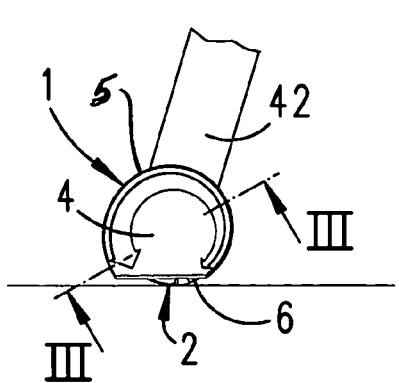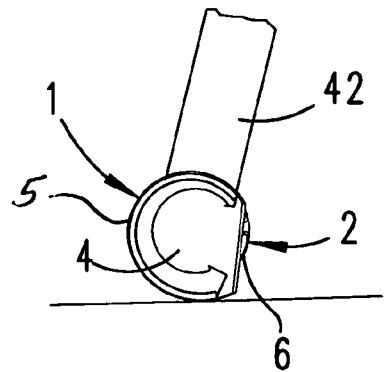

LOAD-BEARING FRAMEWORKS

PRIORITY CLAIM

The application claims priority of German patent application No. 10319067.8 filed on Apr. 28, 2003, the entire disclosure of which is incorporated herein by reference.

CROSS REFERENCE TO RELATED APPLICATIONS

The present application relates to the following commonly-owned pending patent application: U.S. patent application Ser. No. 10/769,200 filed on Jan. 29, 2004.

BACKGROUND OF THE INVENTION

The present invention relates to load-bearing frameworks. In an embodiment of the present invention, a load-bearing framework, table or the like has four feet, at least one foot being formed by a cap which is associated with a cap-carrier such that the cap can be rotated about a horizontal axis. The cap forms a standing surface by way of a portion of its circumferential surface.

A load-bearing framework is already known from German patent document number DE 199 21 455 A1. The load-bearing framework described in the German patent document has four feet which are formed by plastics-material caps which are plugged onto the ends of two load-bearing tubes. Legs are secured on the load-bearing tubes, the two legs of each load-bearing tube being articulated to one another in a pivotable manner. The load-bearing framework is in the form of a roller-type stand. However, it may also carry a work top or clamping plates. If the existing load-bearing framework is set up on an uneven underlying surface, then it rocks. The prior art makes various proposals in order to prevent an object which stands on four feet from rocking. For example, French patent document number FR 564 568 describes the possibility of lengthening or shortening one of four legs by means of a spindle. This method of height adjustment, however, is not possible for such feet as are described by the generic description of feet in German patent document number DE 199 21 455 A1.

SUMMARY OF THE INVENTION

An advantage of the present invention is to provide a load-bearing framework or the like that stands in a stable manner even if the floor or ground is uneven.

In an embodiment of the present invention, a circumferential surface of a cap runs along a helical curve around the horizontal axis. This configuration allows adaptation to an irregular, uneven underlying surface simply by virtue of the cap being rotated about its horizontal axis. This is advantageous, in particular, if the cap is located on a separate cap-carrier which is plugged onto the end of a load-bearing tube. Of course, it is also possible for the load-bearing tube itself to perform the cap-carrier function.

The shaped cap-carrier preferably has a circumferential surface which is concentric with the horizontal axis and bearingly supports an inner cavity wall of the cap with sliding action. It is possible for the diameter of the cap-carrier to be larger than the load-bearing tube onto which the cap-carrier is plugged. The cap-carrier may be shaped in a manner identical to the other three feet. The cap can be a supplementary part. It can even be retrofitted.

The cap can be secured on the cap-carrier by means of a central fastening screw. The fastening screw is preferably screwed into the cavity of the cap-carrier. It can be advantageous if a base boss extends from the base of this plug-on cavity of the cap-carrier. A screw-on boss of the cap projects into this base boss, the fastening screw being screwed into the screw on boss.

The end surface of the cap-carrier may be curved. That surface of the cap-cavity base which is located opposite this curved end surface is curved in the same way.

In one preferred configuration, the cap wall which is in the form of a rotary wedge encloses the circumferential surface of the cap only to an incomplete extent. An opening preferably remains, through which a sub-portion of the circumference of the cap-carrier can project. The sub-portion of the cap-carrier circumferential surface which projects through the opening may also have a standing-surface function. It performs this function if the load-bearing framework is set up on an uneven underlying surface. Rotation of the cap about the horizontal axis allows the rotary wedge to be pivoted downward. It then forms a standing surface which can be adjusted in height by a corresponding rotary position of the cap. In order to reduce the amount of material used and to achieve a certain damping function, the thick-walled portion of the rotary-wedge-configuration cap wall forms cavities. These cavities form compartments which are separated by crosspieces.

Additional features and advantages of the present invention are described in, and will be apparent from, the following Detailed Description of the Invention and the figures.

BRIEF DESCRIPTION OF THE FIGURES

An exemplary embodiment of the invention is explained below with reference to accompanying drawings.

FIG. 3 shows a section view through the fitted plastics-material foot with stabilizer cap along section line III-III of FIG. 5a.

FIG. 5 shows a view of a roller-type stand from the side, the left-hand plastics-material foot being provided with a stabilizer cap.

FIG. 5a is an enlarged, partial view of FIG. 5, showing the plastics-material foot, which is provided with a stabilizer cap according to the present invention, with the stabilizer cap in an inactive position.

FIG. 5b is a view similar to FIG. 5a, but shows the stabilizer cap of FIG. 5a in an active position.

DETAILED DESCRIPTION OF THE INVENTION

Figure 1:
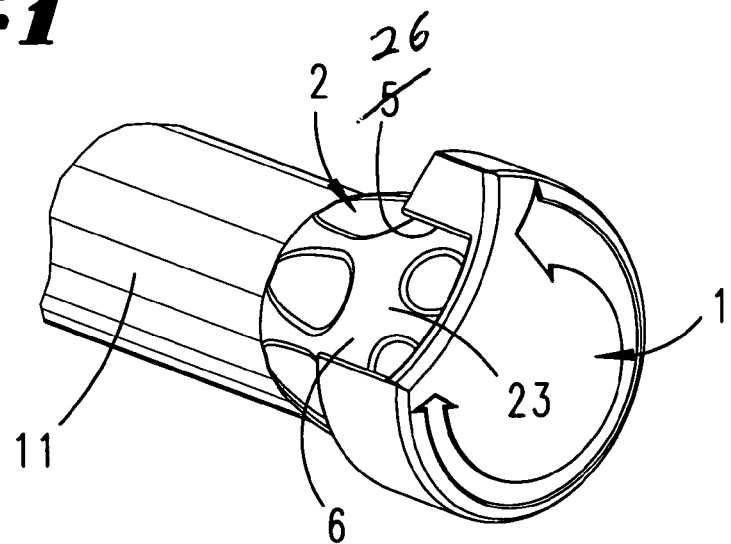
FIG. 1 shows an isometric view of a plastics-material foot which is fitted onto a load-bearing tube and is provided with a stabilizer cap according to the present invention.

An exemplary embodiment of the present invention relates to a roller-type stand 40 as illustrated in FIG. 5. The roller-type stand 40 has two legs 42 which are articulated to one another and are connected to a load-bearing tube 11 in each case at their bottom ends. The load-bearing tubes 11 extend parallel to one another in the horizontal direction. One of the two legs 42 has a height-adjustable portion 44, on which a roller 41 is disposed.

Figure 2:
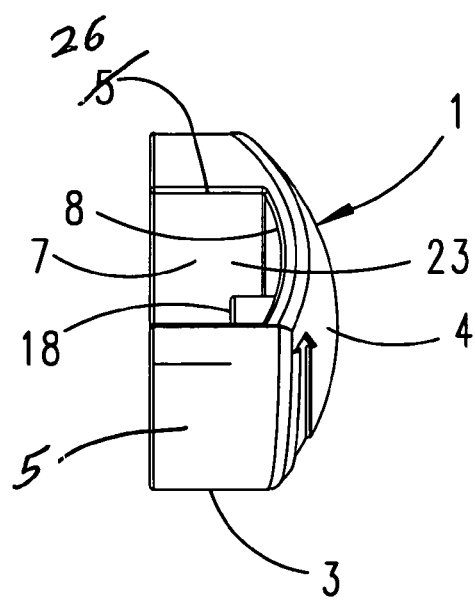
FIG. 2 shows a side view of the stabilizer cap of FIG. 1.
Figure 4:
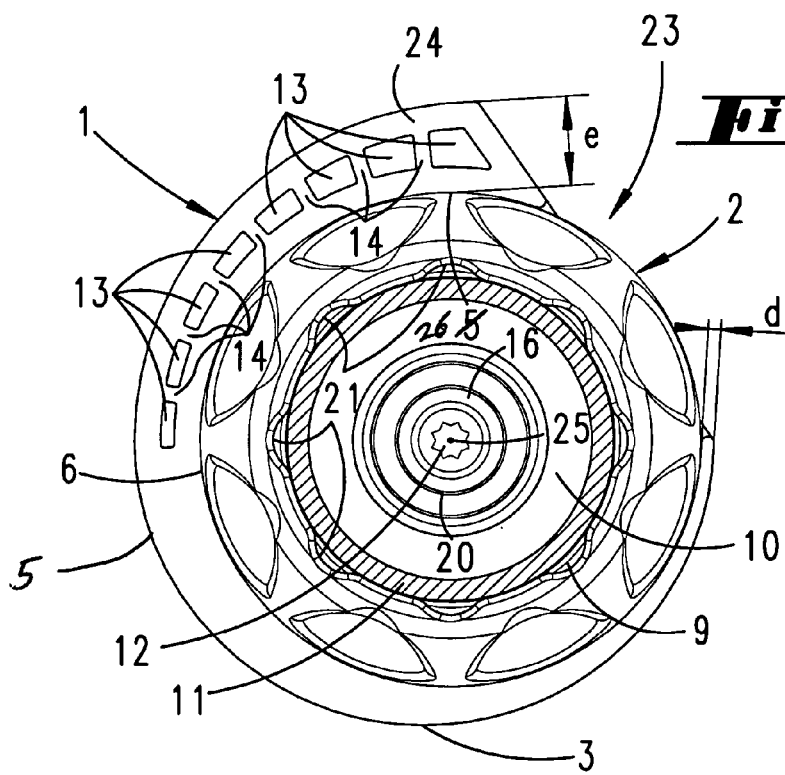
FIG. 4 shows a section view along section line IV-IV of FIG. 3, showing a rear view of the marked plastics-material foot together with the stabilizer cap of FIG. 2.

Referring also to FIG. 1, FIG. 1 shows an end portion of a load-bearing tube 11. A cap 2 is plugged onto each of the four end portions of the two load-bearing tubes 11. The cap 2 consists of plastics material and has a circumferential profiling in the form of a plurality of recesses. Three of the caps 2, in the case of the exemplary embodiment, form feet. A further, stabilizing cap 1 is fitted onto one of the four caps 2. The cap 2 having the stabilizing cap 1 performs the function of a cap-carrier. The cap 1 mounted by the cap-carrier can form a standing surface. The cap 1, as can be gathered from FIGS. 2 and 4, has a circumferential surface 5 in the form of a rotary wedge. The radial thickness of the circumferential wall of the cap 1 increases continuously in the circumferential direction from a small dimension d to a large dimension e, so that the outer circumferential surface of the cap 1 runs helically. Between the thickest portion e and the thinnest portion d, the circumference of the cap wall which forms a standing surface 3 has a cutout 7. If the cutout 7 is oriented downward (see FIG. 5a), the cap-carrier 2 performs the standing function. Part of the circumferential surface 6 of the cap-carrier 2 forms the standing surface which rests on the underlying surface.

Otherwise, the circumferential surface of the cap-carrier 2 forms a bearing surface 6. The bearing surface 6 bearingly supports the inner wall 26 of the cavity of the cap 1. The inner wall 26 of the cap 1, like the bearing surface 6, runs concentrically with a horizontal axis 25.

Figure 3:
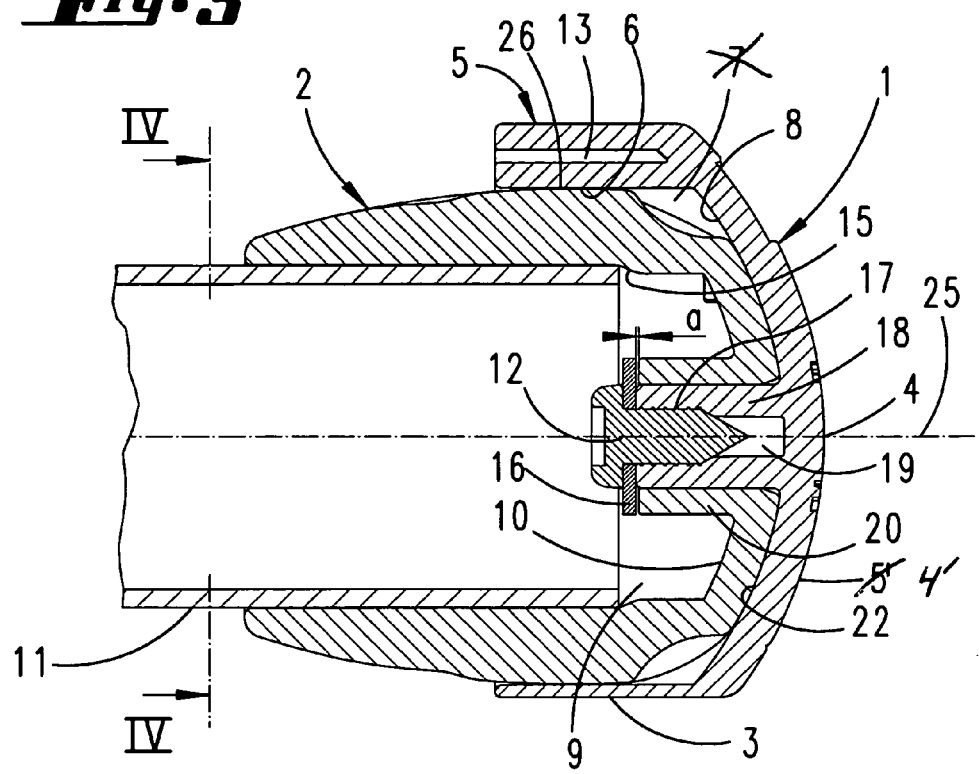

Referring also to FIG. 3, the cavity base 8 of the cap 1 is curved. The curvature of the cavity base 8 corresponds to the end face 22 of the cap-carrier 2. A screw-on boss 18 extends from the center of the cavity base 8. The screw-on boss 18 fits in a base boss 20 of the end face 22 of the cap-carrier 2. The base boss 20 extends into a plug-on cavity formed by the cavity of the cap-carrier 2. With the interposition of a washer 19, the screw-on boss 18 is connected to the base boss 20 via a fastening screw 12 such that the cap 1 can be rotated about the axis 25.

The plug-on cavity 9 has a reduced-diameter portion in the vicinity of the base 10 of the cap-carrier 2, resulting in the formation of a stop protrusion 15 against which strikes the end of the load-bearing tube 11 onto which the cap-carrier 2 is plugged by way of its plug-on cavity 9.

The outside 4 of the cap 1 has a double arrow which indicates the rotatability of the cap 1 in relation to the cap-carrier 2.

In order to realize a certain clamping force by means of which the cap-carrier 2 rests on the end portion of the load-bearing tube 11, the plug-on cavity 9 has a plurality of recesses 21.

The thickest portion of the circumferentially continuously thickening circumferential wall of the cap 1 has compartments 13, which provide the thickest portion 24 with a certain degree of elasticity. The compartments 13 are separated from one another by means of crosspieces 14.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A load-bearing framework comprising:
a plurality of legs coupled to each other, the legs being positionable on a support surface, a first one of the legs extending along a first axis, the first leg having a first end;
at least one tube coupled to the first end of the first leg, the tube extending along a second axis, the second axis intersecting with the first axis;
a cap coupled to the at least one tube;
at least one rotor which is rotatably coupled to the cap, the rotor being rotatable about the second axis, the rotor including an outer engagement wall configured to engage the support surface, the outer engagement wall having an asymmetrical shape, the at least one rotor being rotatable between:
(a) a first position which distances the first end of the first leg from the support surface by a first distance; and
(b) a second position which distances the first end of the first leg from the support surface by a greater, second distance.

2. The load-bearing framework of claim 1, wherein:
(i) the at least one rotor has a cavity base; and
(ii) the cap has an end face, wherein the end face corresponds to the cavity base.

3. The load-bearing framework of claim 2, which includes a base screw-on boss extending from a center of the cavity base.

4. The load-bearing framework of claim 2, wherein the end face forms a base boss.

5. The load-bearing framework of claim 1, wherein the rotor defines an opening configured to expose a portion of the cap to the support surface when the rotor has a designated angular position.

6. The load-bearing framework of claim 1, wherein the rotor includes an indicator which indicates an increase in height adjustment associated with a designated direction of rotation of the rotor.

7. The load-bearing framework of claim 1, wherein the outer engagement wall is helically-shaped.

8. The load-bearing framework of claim 1, which includes a roller coupled to at least one of the legs.

9. A load-bearing framework comprising:
a plurality of legs coupled to each other, the legs being positionable on a support surface, the legs including:
(a) a first leg extending along a first axis, the first leg having a first lower portion and a first upper portion;
(b) a second leg extending along a second axis, the second leg having a second lower portion and a second upper portion;
a roller coupled to at least one of the first and second upper portions; and
at least one rotor which is rotatably coupled to the first lower portion of the first leg, the at least one rotor being rotatable about a third axis, the at least one rotor including an outer engagement wall configured to engage the support surface, the outer engagement wall having an asymmetrical shape, the at least one rotor being rotatable between:
(a) a first position which distances the first lower portion from the support surface by a first distance; and
(b) a second position which distances the first lower portion from the support surface by a greater, second distance.

10. The load-bearing framework of claim 9, which includes at least one tube coupled to the first lower portion, the tube extending along the third axis, the third axis intersecting with the first axis.

11. The load-bearing framework of claim 10, which includes a cap coupled to the tube.

12. The load-bearing framework of claim 11, wherein the at least one rotor is rotatably coupled to the cap.

13. The load-bearing framework of claim 12, wherein the rotor defines an opening configured to expose a portion of the cap to the support surface when the rotor has a designated angular position.

14. The load-bearing framework of claim 9, wherein the rotor includes an indicator which indicates an increase in height adjustment associated with a designated direction of rotation of the rotor.

15. The load-bearing framework of claim 9, wherein the outer engagement wall is helically-shaped.

16. A load-bearing framework comprising:
a plurality of legs coupled to each other, the legs being positionable on a support surface, a first one of the legs extending along a first axis, the first leg having a first end;
a tube coupled to the first end of the first leg, the tube extending along a second axis, the tube having a tube end;
a cap coupled to the tube end; and
a rotor which is rotatably coupled to the tube end, the rotor being rotatable about the second axis, the rotor including a support surface engagement wall configured to engage the support surface, the support surface engagement wall having an asymmetrical shape, the support surface engagement wall defining an opening, the at least one rotor being rotatable between:
  (a) a first position in which the opening is oriented toward the support surface, the tube end being distanced from the support surface by a first distance; and
  (b) a second position in which the tube end is distanced from the support surface by a greater, second distance.

17. The load-bearing framework of claim 16, wherein:
(i) the rotor has a cavity base; and
(ii) the cap has an end face, wherein the end face corresponds to the cavity base.

18. The load-bearing framework of claim 17, which includes a base-screw-on boss extending from a center of the cavity base.

19. The load-bearing framework of claim 16, wherein the support surface engagement wall is helically-shaped.

20. The load-bearing framework of claim 16, which includes a roller coupled at least one of the legs.

21. A load-bearing framework comprising:
a plurality of legs coupled to each other, the legs being positionable on a support surface, a first one of the legs extending along a first axis, the first leg having a first end;
a tube coupled to the first end of the first leg, the tube extending along a second axis, the tube having a tub end;
a cap coupled to the tube end; and
a rotor which is rotatably coupled to the cap, the rotor being rotatable about the second axis, the rotor including a support surface engagement wall configured to engage the support surface, the support surface engagement wall having an asymmetrical shape, the support surface engagement wall defining an opening, the at least one rotor being rotatable between:
  (a) a first position in which the opening is oriented toward the support surface, the tube end being distanced from the support surface by a first distance; and
  (b) a second position in which the tube end is distanced from the support surface by a greater, second distance.

22. The load-bearing framework of claim 21, wherein the opening exposes a portion of the cap to the support surface when the rotor has the first position.

23. A load-bearing framework comprising:
a plurality of legs coupled to each other, the legs being positionable on a support surface, a first one of the legs extending along a first axis, the first leg having a first end;
a tube coupled to the first end of the first leg, the tube extending along a second axis, the tube having a tub end; and
a rotor which is rotatably coupled to the tube end, the rotor being rotatable about the second axis, the rotor including a support surface engagement wall configured to engage the support surface, the support surface engagement wall being helically-shaped, the support surface engagement wall defining an opening, the at least one rotor being rotatable between:
  (a) a first position in which the opening is oriented toward the support surface, the tube end being distanced from the support surface by a first distance; and
  (b) a second position in which the tube end is distanced from the support surface by a greater, second distance.

* * * * *